United States Patent [19]

Neblung et al.

[11] 4,102,529
[45] Jul. 25, 1978

[54] RAILING SYSTEM

[76] Inventors: Werner H. Neblung, 205 Cupsaw Lake Dr., Ringwood, N.J. 07456; Gerhard O. Petrich, 41 Algonquin Way, West Milford, N.J. 07480

[21] Appl. No.: 794,452
[22] Filed: May 6, 1977
[51] Int. Cl.² .................... E04H 17/14; A47H 1/14
[52] U.S. Cl. ............................... 256/70; 248/251; 403/297; 403/381
[58] Field of Search ............... 256/65–70, 256/59.22; 248/251; 403/381, 290, 297, 292

[56] References Cited

U.S. PATENT DOCUMENTS

| Re. 28,643 | 12/1975 | Blum | 256/59 |
|---|---|---|---|
| 2,997,317 | 8/1961 | Scott | 403/297 X |
| 3,306,585 | 2/1967 | Blum | 256/65 |
| 3,351,324 | 11/1967 | Blum et al. | 403/297 X |
| 3,372,909 | 3/1968 | Attaway | 256/69 |
| 3,516,644 | 6/1970 | Horgan, Jr. | 256/22 X |
| 3,918,686 | 11/1975 | Knott et al. | 256/65 X |
| 3,991,981 | 11/1976 | Wu | 256/65 |

FOREIGN PATENT DOCUMENTS 528,621  8/1921  France .................. 403/381

Primary Examiner—James Kee Chi
Attorney, Agent, or Firm—Samuelson & Jacob

[57] ABSTRACT

A railing system has a mounting arrangement including mounting brackets selectively located within a longitudinal slot in a rail member or in an upright standard, each slot and each mounting bracket having complementary wedge-shaped cross-sectional configurations and each mounting bracket including separate elements secured to one another but urged apart laterally to wedge the mounting bracket securely in place within a slot at any selected longitudinal location. Adjacent rail members are joined together end-to-end by connectors received within a D-shaped cavity in the rail members, the connectors having a complementary, split D-shaped cross-sectional configuration which is flexed outwardly by clamping screws to clamp each connector within adjacent abutted rail members.

19 Claims, 12 Drawing Figures

RAILING SYSTEM

The present invention relates generally to railing systems and pertains, more specifically, to the assembly and installation of railing systems such as hand railings, protective rails, ornamental railing structures and the like.

The widespread use of railing systems in industrial, commercial and residential installations has led to the requirement for aesthetically pleasing structures which are readily installed at a variety of sites with a minimum of effort. Ease of installation is usually attained by fabricating as much of a railing system as is practical within the manufacturing facility, thereby minimizing the number and complexity of operations in the field. However, such procedures generally sacrifice the flexibility of tailoring the railing system on site to meet any special requirements peculiar to a particular installation. Various attempts to provide railing systems which can be built-up of standard component parts in the field to meet the needs of a particular site often become complex, ungainly, and somewhat lacking in aesthetic appeal. Some systems require special tools or special procedures which go beyond what may be available to a worker in the field having limited skills and facilities.

It is therefore an object of the present invention to provide a railing system which is aesthetically appealing, yet enables flexibility of installation at a variety of installation sites without special fabrication in the manufacturing facility or complex operations in the field.

Another object of the invention is to provide a railing system which is easily erected in the field from a minimum number of different component parts to establish a railing of strength and durability, as well as aesthetic appeal.

Still another object of the invention is to provide a railing system of the type described which is readily installed with available simple tools which are easily employed by workers of limited skill.

A further object of the invention is to provide a railing system which enables flexibility of design and appearance with a minimum number of interchangeable, economically fabricated component parts.

A still further object of the invention is to provide a railing system which is equally suitable for small residential applications as well as the larger commercial and industrial installations.

Another object of the invention is to provide a railing system which permits the replacement of damaged component parts or the rearrangement of various component parts after installation so as to enable repair or redesign at any time.

Still another object of the invention is to provide a railing system of the type described which is made up of economically fabricated component parts readily made available in a variety of finishes for a wide latitude in the choice of aesthetic appearance.

The above objects, as well as still further objects and advantages, are attained by the present invention, which may be described briefly as providing, in a mounting arrangement for a railing system, a railing system member having a longitudinal slot therein, the slot including a longitudinal opening having a lateral width extending between opposite edges, a bottom face spaced inwardly of the opening and a transverse cross-sectional configuration which is at least partly wedge-shaped and is wider than the lateral width of the opening at locations spaced inwardly from the opening and tapers in the inward direction gradually laterally outwardly to said locations to establish at least one laterally outwardly tapered side wall in the slot, a mounting bracket having first and second portions adapted to be placed side-by-side within the slot at any selected longitudinal location therein, at least one portion having a top face and a tapered side surface complementary to the corresponding tapered side wall of the slot, actuating means adapted to be advanced relative to one portion of the mounting bracket to abut the other portion so as to urge one portion laterally away from the other portion, and means for essentially precluding movement of the first and second portions relative to one another in the direction parallel to the inward direction so that the lateral movement of one portion away from the other portion will engage the complementary tapered mounting bracket side surface and slot side wall and urge the bottom face of the slot toward the top face of each portion of the mounting bracket to secure the railing system member and the mounting bracket in wedged engagement with one another.

The invention will be more fully understood, while still further objects and advantages will become apparent, in the following detailed description of preferred embodiments of the invention illustrated in the accompanying drawing, in which.

Figure 1:
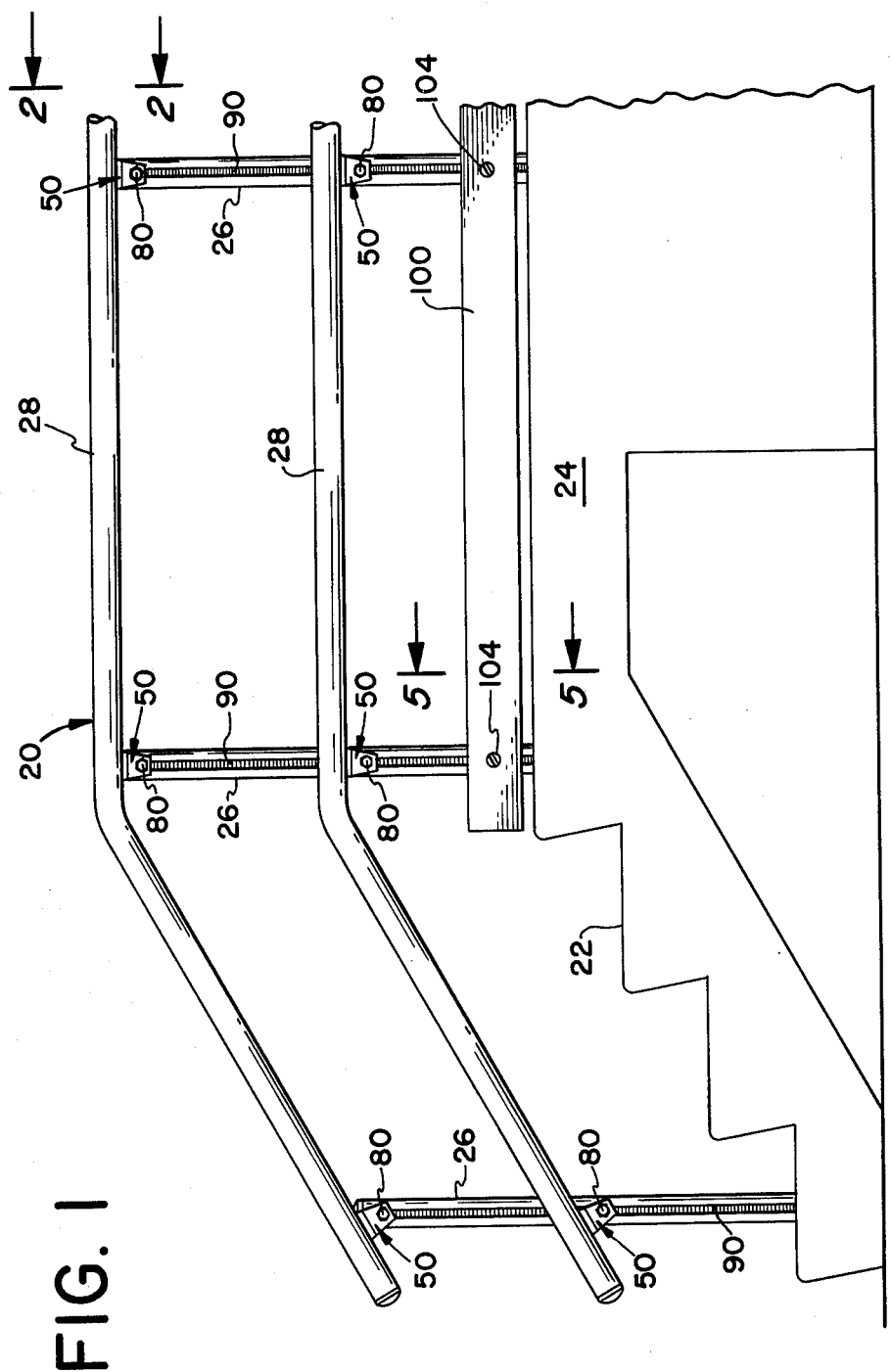
FIG. 1 is a side elevational view of a typical railing system constructed in accordance with the invention.

Referring now to the drawing, and especially to FIG. 1 thereof, a railing system constructed in accordance with the present invention is illustrated generally at 20. Railing system 20 is installed along a stairway 22 and a platform 24 and includes a plurality of like first railing system members in the form of upright standards 26 and similar second railing members in the form of rail members 28 affixed to the standards 26.

Figure 2:
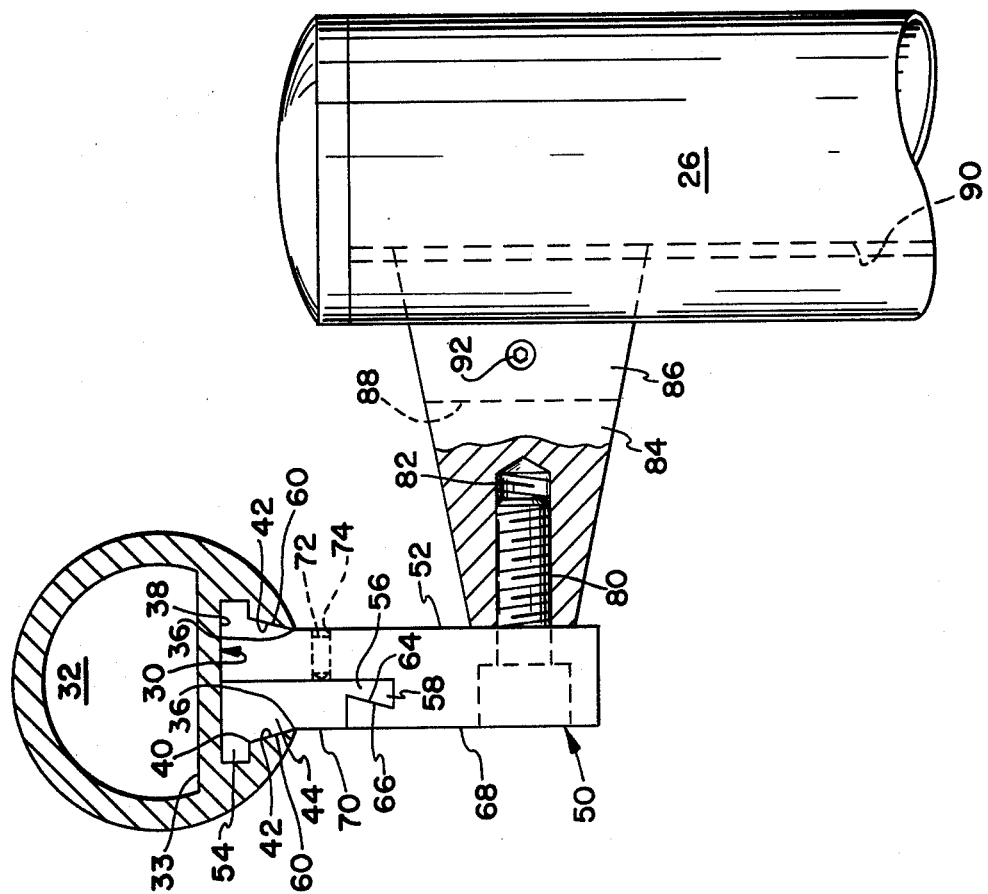
FIG. 2 is an enlarged fragmentary cross-sectional view taken along line 2—2 of FIG. 1.
Figure 3:
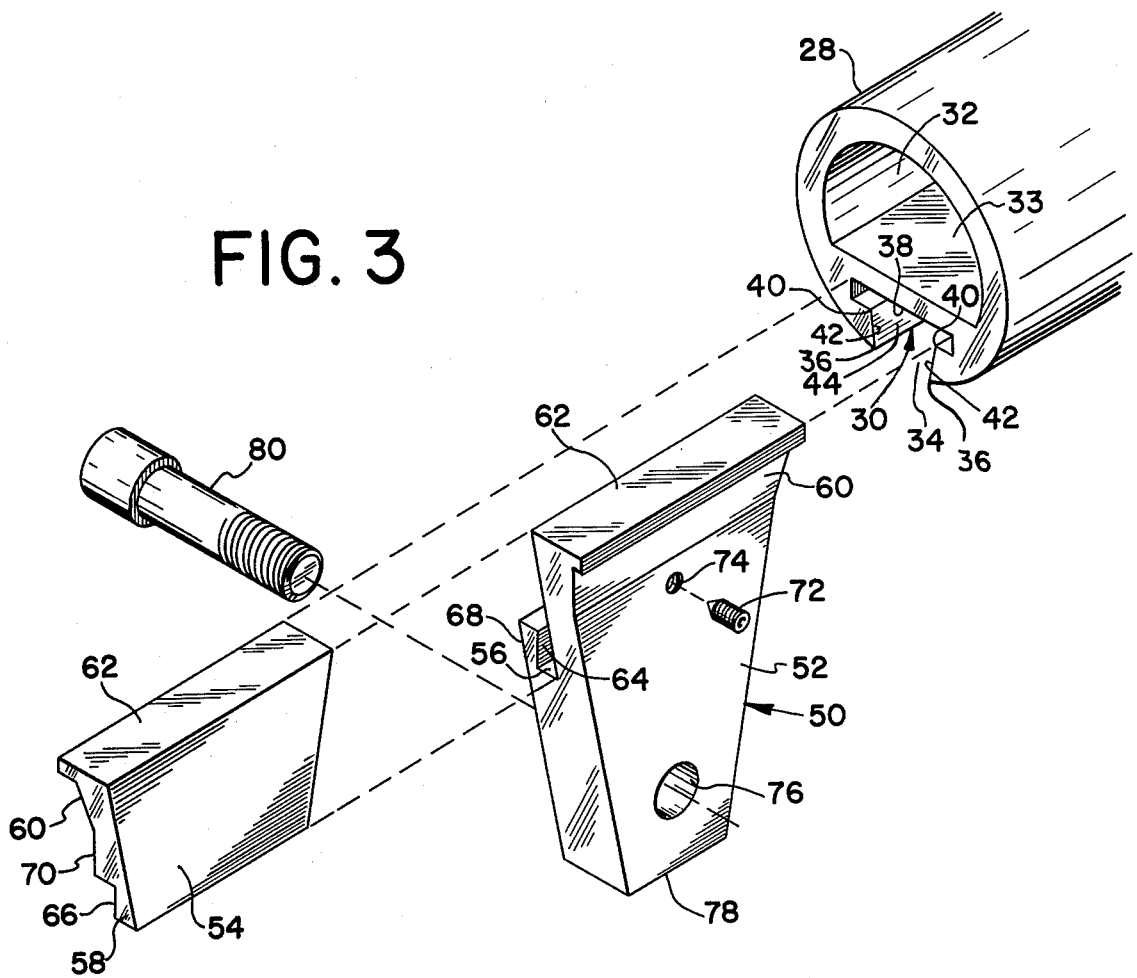
FIG. 3 is an enlarged, exploded perspective view of component parts of the railing system.

As best seen in FIGS. 2 and 3, as well as in FIG. 1, rail members 28 are elongate tubular members and include a longitudinal slot 30 and an internal cavity 32, each extending along the length of the rail member 28 and separated from one another by a web 33. Rail members 28 may be fabricated readily by extrusion in indeterminate lengths having a consistent cross-sectional configuration along the length thereof.

Slot 30 has a longitudinal opening 34 which extends laterally between opposite edges 36. A bottom face 38 is spaced inwardly from the opening 34 and the transverse cross-sectional configuration of slot 30 is generally wedge-shaped between the opening 34 and an inside corner 40, the side walls 42 of the slot 30 diverging between the opening 34 and corners 40 so that slot 30 becomes wider than the lateral width of opening 34 at locations spaced inwardly from opening 34 and the side walls 42 are tapered gradually outwardly. The bottom face 38 extends laterally beyond the inside corners 40 to establish a generally T-shaped transverse cross-sectional configuration, with the tapered side walls 42 extending along the stem 44 of the T-shaped configuration so that the stem 44 is wedge-shaped.

A plurality of mounting brackets 50 secure the rail members 28 to the standards 26. Each mounting bracket 50 has a first portion in the form of first element 52 and a second portion in the form of separate second element 54. First element 52 has a groove 56 extending downwardly into element 52 and longitudinally from front to back of the element. Second element 54 has a tongue 58 complementary to groove 56 and projecting downwardly from element 54. Each element 52 and 54 has a tapered side surface 60 tapering outwardly in an upward direction toward the top surface 62 of each respective element.

A bracket 50 may be placed at any longitudinal location along a rail member 28 by inserting each element 52 and 54 separately into slot 30 and then assembling the bracket 50 by sliding the tongue 58 of element 54 longitudinally into the groove 56 of the other element 52 until elements 52 and 54 are placed side-to-side. The tapered side surfaces 60 and the top surface 62 are complementary to the generally T-shaped transverse cross-sectional configuration of slot 30. Tongue 58 is provided with a wedge-shaped cross-sectional configuration and groove 56 has a complementary wedge-shaped configuration by virtue of complementary tapered side surfaces 64 and 66, the taper being in a direction opposite to the taper of the wedge-shaped stem 44 of slot 30 and the complementary side surfaces 60 of the elements 52 and 54. Preferably, groove 56 is spaced laterally from the outer side wall 68 of element 52 and tongue 58 is likewise spaced from outer side wall 70 of element 54 so that side walls 68 and 70 are flush when the elements 52 and 54 are assembled.

In order to secure the assembled elements 52 and 54, and hence bracket 50, in place at any selected location along a rail member 28, actuating means are placed in the bracket 50 to urge one element laterally away from the other when the assembled elements are in the slot 30. The actuating means is shown in the form of a set screw 72 threaded laterally through a threaded opening 74 in the first element 52 and abutting the second element 54. Advancement of the set screw 72 toward the second element 54 will urge the elements 52 and 54 laterally away from one another. In response to such urging, the tapered side surfaces 60 will act upon the tapered side walls 42 of slot 30 to pull the rail member 28 downwardly and draw bottom face 38 toward the top surfaces 62 of the bracket 50. At the same time, the complementary wedge-shaped configurations of the tongue 58 and groove 56 tend to pull the tongue 58 into the groove 56 so that relative upward and downward movement between the elements 52 and 54 is precluded. Thus, merely by tightening the set screw 72, the bracket 50 is securely locked in place at any longitudinal location along the slot 30. By loosening set screw 72, bracket 50 may be moved along the slot 30 to any desired location, without any tendency for the bracket 50 to unintentionally drop out of the slot 30.

Figure 4:
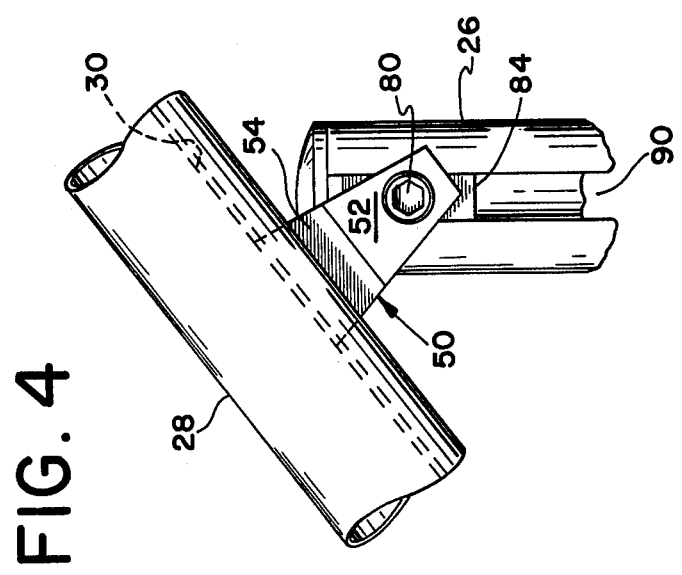
FIG. 4 is an enlarged fragmentary view of a portion of FIG. 1.

Element 52 of bracket 50 includes a laterally-extending aperture 76 adjacent lower end 78 of the bracket for receiving a threaded fastener in the form of bolt 80 which is threaded into a threaded hole 82 in a further mounting bracket in the form of a cantilever arm 84 (see FIG. 2). Arm 84 is constructed similar to bracket 50 in that the arm 84 has two parts 86 and 88 similar to elements 52 and 54 and received within a slot 90 in standard 26, which slot 90 has a configuration similar to slot 30 in each rail member 28. Operation of a set screw 92 enables arm 84 to be located at any position along slot 90, which runs the length of standard 26. Thus, rail height is readily adjusted by raising or lowering arm 84 within slot 90 and then securing the arm 84 in place by operating set screw 92. The inclination of rail member 28 relative to standard 26 is readily adjusted by loosening bolt 80, setting the desired angle between bracket 50 and standard 26, as seen in FIG. 4, and then tightening bolt 80.

Figure 5:
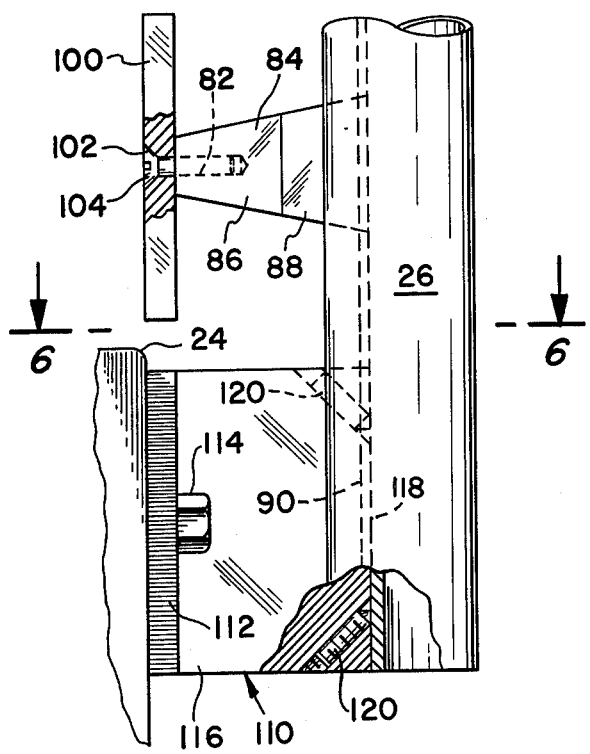
FIG. 5 is an enlarged, fragmentary cross-sectional view taken along line 5—5 of FIG. 1.

In addition to the rail members 28, the installation illustrated in FIG. 1 includes a kick plate 100 located along the edge of the platform 24. The inclusion of kick plate 100 becomes a relatively simple matter in that all that is required is the addition of another arm 84 within the slot of each standard 26, the added arms 84 being located adjacent the edge of the platform, as seen in FIG. 5. Kick plate 100 is provided with countersunk apertures 102 for the reception of threaded fasteners in the form of flat headed bolts 104 threaded into the hole 82 of each arm to secure the kick plate 100 in place.

Figure 6:
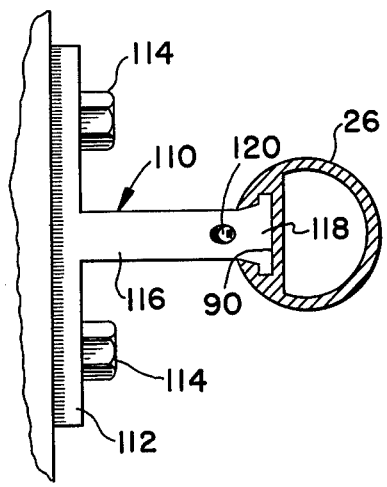
FIG. 6 is a cross-sectional view taken along line 6—6 of FIG. 5.

As best seen in FIGS. 5 and 6, each standard 26 is mounted upon the platform 24, or upon the stairway 22, by means of a mount 110 having a base plate 112 secured to the platform by bolts 114, and a web plate 116 extending from the base plate 112. The web plate 116 terminates in a generally T-shaped outer end 118 which is complementary to the configuration of the slot 90 in each standard 26. A standard 26 is placed upon the outer end 118 of the web plate 116 by engaging the outer end 118 with the slot in the standard 26, then the standard is located relative to the mount 110 and platform 24 and is secured in place by a pair of angled set screws 120 threaded through threaded apertures in the web plate 116 to engage the bottom of slot 90 in the standard 26 and wedge the complementary configurations of slot 90 and outer end 118 into locking engagement with one another.

Figure 8:
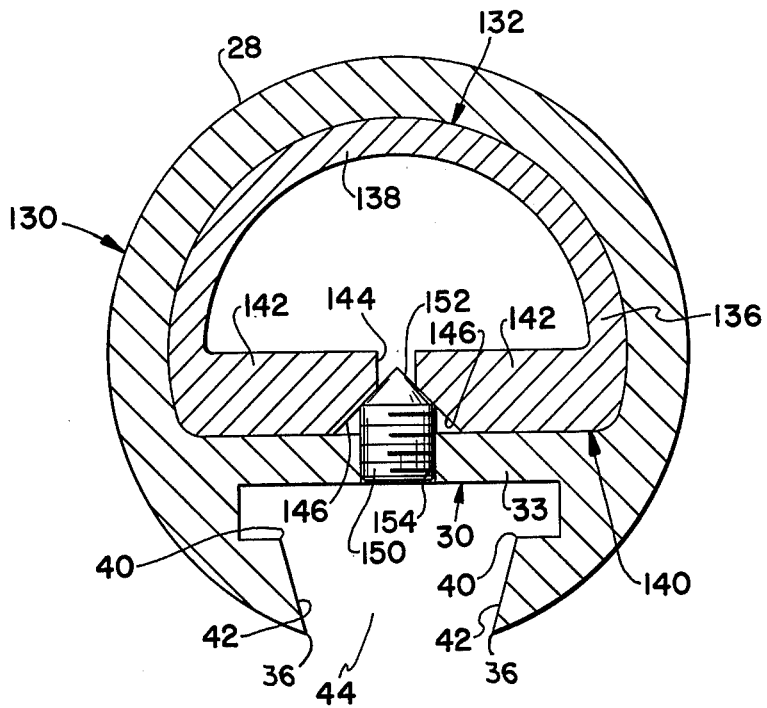
FIG. 8 is an enlarged transverse cross-sectional view taken through a completed splice connection.
Figure 7:
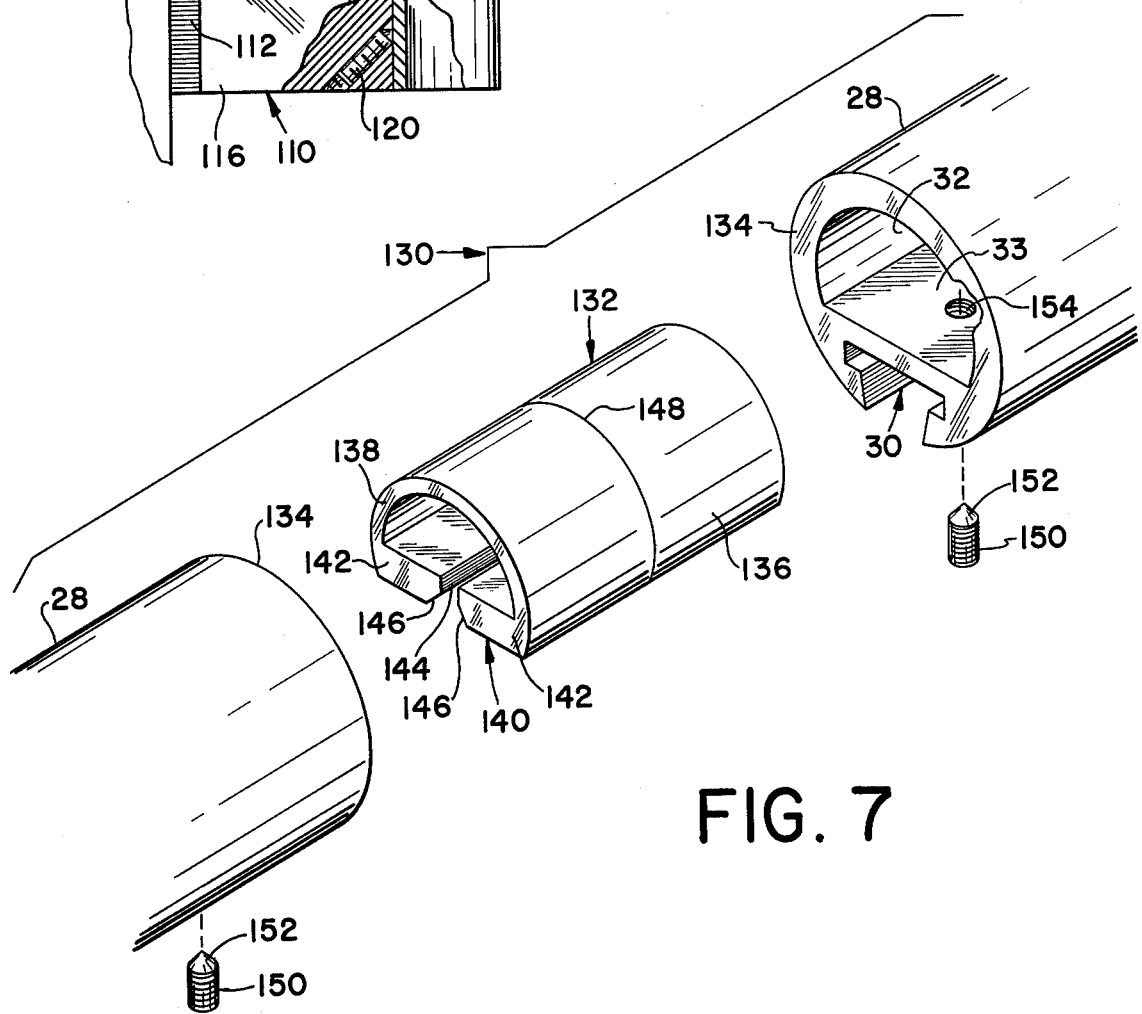
FIG. 7 is an enlarged, exploded perspective view of a splice connection between adjacent rail members in the railing system.

Turning now to FIGS. 7 and 8, economical fabrication of railing systems constructed in accordance with the invention is aided by supplying rail members 28 in predetermined lengths which can either be shortened or spliced in the field to meet the requirements of a particular installation. Shortening is readily accomplished by cutting the rail member 28 to an appropriate length. Splicing for increasing the length of a railing beyond the predetermined length of a supplied rail member is accomplished with a splice connector arrangement shown generally at 130. Splice connector arrangement 130 includes a connector 132 receivable within the cavity 32 of each rail member 28 at the ends 134 to be joined. Connector 132 has a longitudinally extending wall 136 with a generally D-shaped transverse cross-sectional configuration complementary to the cavity 32 in each rail member 28. The wall 136 of connector 132 has a length great enough to extend into the cavities 32 of end-to-end rail members 28 a sufficient distance to assure a good splice connection.

Wall 136 of connector 132 includes an arcuate portion 138, which is somewhat flexible, and a relatively straight portion 140 divided into sections 142 by a central slit 144 extending longitudinally along the length of the connector 132 and having a given width. Sections 142 preferably are somewhat thicker than arcuate portion 138 to resist bending and remain relatively rigid. A chamfer 146 is provided at each edge of the slit 144, and a guide line 148 may be provided midway between the ends of the connector 132, for purposes which will be explained below.

A splice connection is made between the ends 134 of rail members 28 by inserting connector 132 into the cavity 32 of one rail member and aligning the guide line 148 with the end 134 of the one rail member 28. A clamping screw in the form of a set screw 150 having a conical point 152 is threaded into a corresponding threaded aperture 154 in the web 33 of the rail member 28. Aperture 154 is aligned with the slit 144 and has a diameter greater than the width of the slit 144 so that upon advancement of set screw 152 through aperture 154 the conical point 152 will enter slit 144. Since set screw 152 has a larger diameter than the width of slit 144, the conical point 152 will engage the confronting chamfers 146 and start to urge the connector 132 upwardly and the confronting edges of slit 144 away from one another thereby tending to lock the connector 132 in position. As soon as connector 132 is lightly secured within the first rail member 28, the second rail member 28 is pushed over the protruding portion of the connector 132 and brought into abutment with the first rail member. Another set screw 152 is placed in another aperture 154 located in the second rail member 28 and both set screws 152 are fully tightened. The resulting advancement of the conical points 152 against the chamfers 146 will urge the connector 132 upwardly and the sections 142 apart, by virtue of the complementary tapers provided by the points 152 and chamfers 146, the rigidity of the sections 142 and the flexibility of the arcuate wall portion 138. The arcuate wall portion 138 will frictionally grip the complementary surrounding wall of each of the rail members 28, thereby securing the rail members together in an effective splice connection. The set screws 150, when fully seated, will not protrude below the web 33 so as to remain out of slot 30, thereby leaving slot 30 clear for brackets 50.

Figure 9:
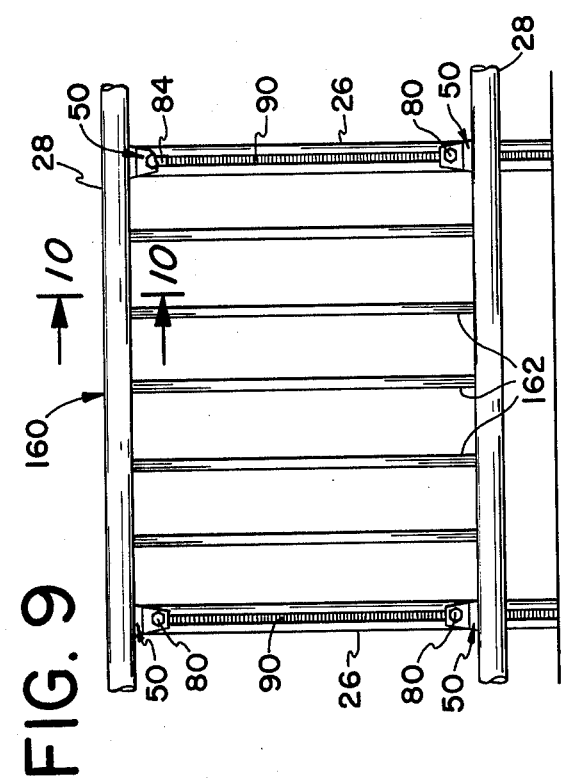
FIG. 9 is a side elevational view of a railing system constructed in accordance with the invention and employing balusters spaced between the upright standards along upper and lower rail members.
Figure 10:
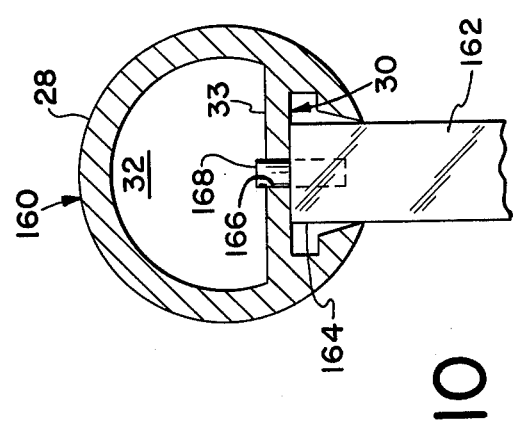
FIG. 10 is an enlarged cross-sectional view taken along line 10—10 of FIG. 9.

Referring now to FIGS. 9, 10, 11 and 12, decorative railing systems are easily constructed employing the same component parts as described above in connection with railing system 20. As seen in FIG. 9, a railing system 160 includes standards 26 and rail members 28 affixed to the standards 26 by brackets 50 and arms 84 in much the same manner as described above. However, in railing system 160, the lower of the two rail members 28 is inverted relative to the upper rail member so that the slots 30 in the rail members 28 face one another. A plurality of balusters 162 extend between the slots 30, the ends 164 of the balusters 162 being seated within each slot 30 as seen in FIG. 10. The spacing between the rail members 28 is adjusted readily, by selective upward or downward movement of arms 84 as described above, to secure the balusters 162 between the upper and lower rail members 28. As an added aid to maintaining the longitudinal spacing between balusters 162, as well as for enhancing the securement of the individual balusters in place in the system, a series of locator holes 166 may be placed in each web 33 of the rail members 28 and locator pins 168, made integral with the ends 164 of balusters 162, may be inserted into the locator holes 166, as shown in FIG. 10.

Figure 11:
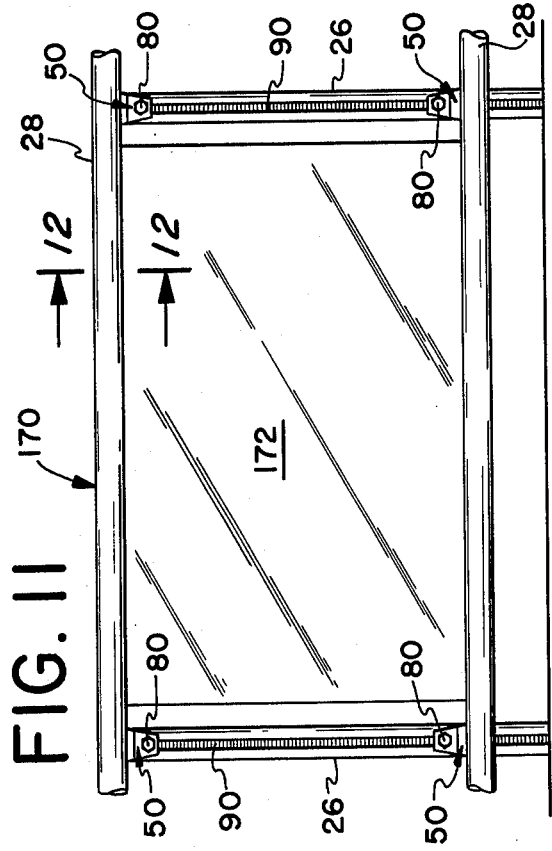
FIG. 11 is a side elevational view similar to FIG. 9, but showing a panel placed between spaced upright standards and parallel upper and lower rail members.
Figure 12:
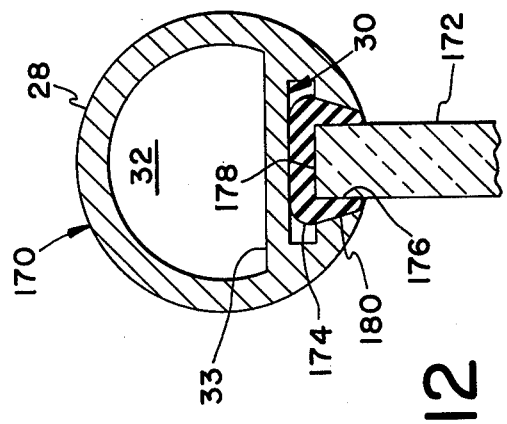
FIG. 12 is an enlarged cross-sectional view taken along line 12—12 of FIG. 11.

In another decorative railing system 170, illustrated in FIGS. 11 and 12, a panel 172 is placed in the confronting slots 30 of the upper and lower rail members 28 and is secured in place by means of a channel member 174 of elastomeric material placed in each slot 30, as seen in FIG. 12. The channel member 174 includes an inner surface 176 having a configuration complementary to the edges 178 of panel 172, and an outer surface 180 with a configuration matching the wedge-shaped portion of slot 30. Panel 172 may be fabricated of wood, glass, plastic or metal, either solid or mesh, and is secured in place by adjusting the relative locations of upper and lower railing members 28 on standards 26.

Thus, it will be seen that the present invention provides a simplified and versatile railing system in which economically fabricated component parts are readily assembled in the field for constructing aesthetically pleasing railing arrangements with a minimum of effort and without the requirement for special tools. The standards 26 and rail members 28 are readily fabricated by extrusion and are constructed from the same extruded stock. The bracket elements 52 and 54 are readily cut from extruded stock, and the arm parts 86 and 88 are likewise cut from the same extruded stock. Mounts 110 may be cut from another extruded shape. All of the set screws are operated by commonly available tools and enable quick and easy assembly. The resultant assemblies are aesthetically appealing. In addition, adjustments to the assembled railing systems may be made at any time, including after all of the component parts are assembled, since access is always available to the various set screws. Such access also enables additions to be made to an assembled railing system at any time. Should it be necessary, a railing system constructed in accordance with the invention may be fully dismantled with ease, or partially dismantled for repair, replacement of parts, redesign, or additions without disturbing the balance of the system.

It is to be understood that the above detailed description of preferred embodiments of the invention is provided by way of example only. Various details of design and construction may be modified without departing from the true spirit and scope of the invention as set forth in the appended claims.

The embodiments of the invention in which an exclusive property or privilege is claimed are defined as follows.

1. In a mounting arrangement for a railing system:
a railing system member having a longitudinal slot therein, the slot including a longitudinal opening having a lateral width extending between opposite edges, a bottom face spaced inwardly of the opening and a transverse cross-sectional configuration which is at least partly wedge-shaped and is wider than the lateral width of the opening at locations spaced inwardly from the opening and tapers in the inward direction gradually laterally outwardly to said locations to establish at least one laterally outwardly tapered side wall in the slot;

a mounting bracket having first and second portions adapted to be placed side-by-side within the slot at any selected longitudinal location therein, at least one portion having a top face and a tapered side surface complementary to the corresponding tapered side wall of the slot;

actuating means adapted to be advanced relative to one portion of the mounting bracket to abut the other portion so as to urge one portion laterally away from the other portion; and means for essentially precluding movement of the first and second portions relative to one another in the direction parallel to the inward direction so that the lateral movement of one portion away from the other portion will engage the complementary tapered mounting bracket side surface and slot side wall and urge the bottom face of the slot toward the top face of each portion of the mounting bracket to secure the railing system member and the mounting bracket in wedged engagement with one another.

2. The invention of claim 1 wherein:

the wedge-shaped cross-sectional configuration tapers in the inward direction so as to establish laterally outwardly tapered opposite side walls in the slot; and both of said first and second portions of the mounting bracket have a tapered side surface complementary to the corresponding tapered side wall of the slot.

3. The invention of claim 2 wherein the actuating means is a screw adapted to be threaded laterally through said one portion to abut the other portion such that the screw may be turned to advance and urge one portion laterally away from the other portion.

4. The invention of claim 3 wherein the first and second portions of the mounting bracket are separate individual first and second elements, the first element having a longitudinally extending groove therein;

the second element having a longitudinally extending tongue projecting therefrom in a direction parallel to the inward direction and away from the top face thereof; and the means for essentially precluding relative movement of the first and second elements in the direction parallel to the inward direction includes complementary interlocking transverse cross-sectional configurations in the tongue and groove.

5. The invention of claim 4 wherein:

the groove is spaced laterally from a side wall of the first element; and the tongue is spaced laterally from a corresponding side wall of the second element such that upon assembling the tongue and groove the corresponding side walls of the first and second elements are flush.

6. The invention of claim 4 wherein the first element includes a threaded opening for receiving the screw so that the screw is adapted to be threaded into the first element.

7. The invention of claim 4 wherein the complementary interlocking transverse cross-sectional configurations are wedge-shaped and include tapered surfaces tapering in a direction tending to pull the tongue into the groove in response to the urging of the first and second elements away from one another.

8. The invention of claim 7 wherein the transverse cross-sectional configuration of the slot is a generally T-shaped configuration, the tapered side walls extending along the stem of the T-shaped configuration so that the stem is wedge-shaped.

9. The invention of claim 4 wherein the first element extends between the top face thereof and an opposite end, said first element including fastener-receiving means adjacent said opposite end.

10. The invention of claim 9 wherein the railing system member is a rail member and the fastener-receiving means includes a laterally-extending aperture for receiving a mounting bolt.

11. The invention of claim 9 wherein the railing system member is a standard and the fastener-receiving means includes a threaded hole extending parallel to the inward direction for receiving a mounting bolt.

12. The invention of claim 1 wherein the railing system member is a rail member and the system includes at least two rail members to be joined in longitudinally end-to-end relation to form a continuous railing:

each rail member including a longitudinally extending cavity having a generally D-shaped transverse cross-sectional configuration bounded by an arcuate wall portion and a relatively straight web portion coincident with the bottom face of the longitudinal slot;

a connector receivable within the cavity of each rail member and having a longitudinally extending wall with a D-shaped transverse cross-sectional configuration complementary to the cavity in each rail member, the connector wall having a longitudinal length great enough to extend into the cavities of two end-to-end rail members, and connector wall including a flexible arcuate wall portion, a relatively straight wall portion, and a longitudinal slit of given width dividing the relatively straight wall portion into sections, each section having an edge confronting the corresponding edge of the other section at the slit;

a threaded aperture in the web portion of each rail member, adjacent the end of the rail member, each threaded aperture communicating with the slit when the connector is located within the rail members at the abutting ends thereof; and a clamping screw adapted to be threaded into each aperture, the screw having a diameter greater than the width of the slit and a leading end tapered so as to enter the slit and engage the confrinting edges of the sections upon advancement of the screw into a corresponding aperture when the connector is in place within the abutted ends of the railing members, continued advancement of each screw serving to urge the confronting edges away from one another, thereby flexing the arcuate wall portion and clamping the connector within the ends of the railing members to secure the ends in abutted relation.

13. The invention of claim 12 wherein the length of each clamping screw assures that the end opposite the leading end thereof does not protrude into the longitudinal slot of the railing member once the clamping screw is fully advanced and the connector clamped within the ends of the railing members.

14. The invention of claim 13 wherein the confronting edges of the relatively straight wall sections are tapered complementary to the tapered leading end of each clamping screw.

15. The invention of claim 13 wherein the relatively straight wall sections have a wall thickness greater than the wall thickness of the arcuate wall portion of the connector to enhance the rigidity of the sections.

16. In a railing system in which longitudinally extending hollow rail members are to be joined in longitudinally end-to-end relation to form a continuous railing:
   each rail member including a longitudinally extending cavity having a generally D-shaped transverse cross-sectional configuration bounded by an arcuate wall portion and a relatively straight web portion;
   a connector receivable within the cavity of each rail member and having a longitudinally extending wall with a D-shaped transverse cross-sectional configuration complementary to the cavity in each rail member, the connector wall having a longitudinal length great enough to extend into the cavities of two end-to-end rail members, said connector wall including a flexible arcuate wall portion, a relatively straight wall portion, and a longitudinal slit of given width dividing the relatively straight wall portion into sections, each section having an edge confront the corresponding edge of the other section at the slit;
   a threaded aperture in the web portion of each rail member, adjacent the end of the rail member, each threaded aperture communicating with the slit when the connector is located within the rail members at the abutting ends thereof; and
   a clamping screw adapted to be threaded into each aperture, the screw having a diameter greater than the width of the slit and a leading end tapered so as to enter the slit and engage the confronting edges of the sections upon advancement of the screw into a corresponding aperture when the connector is in place within the abutted ends of the railing members, continued advancement of each screw serving to urge the confronting edges away from one another, thereby flexing the arcuate wall portion and clamping the connector within the ends of the railing members to secure the ends in abutted relation.

17. The invention of claim 16 wherein the length of each clamping screw assures that the end opposite the leading end thereof does not protrude beyond the relatively straight web portion of the railing member once the clamping screw is fully advanced and the connector clamped within the ends of the railing members.

18. The invention of claim 17 wherein the confronting edges of the relatively straight wall sections are tapered complementary to the tapered leading end of each clamping screw.

19. The invention of claim 17 wherein the relatively straight wall sections have a wall thickness greater than the wall thickness of the arcuate wall portion of the connector to enhance the rigidity of the sections.

* * * * *